United States Patent [19]

Springborn

[11] 4,303,416
[45] Dec. 1, 1981

[54] PROCESS AND APPARATUS FOR THE MANUFACTURE OF SINTERED TUNGSTEN CARBIDE TOOL TIPS

[75] Inventor: Karl S. Springborn, Wheeler's Hill, Australia

[73] Assignee: Austung Proprietary Limited, South Yarra, Australia

[21] Appl. No.: 84,296

[22] Filed: Oct. 12, 1979

[30] Foreign Application Priority Data

Oct. 20, 1978 [AU] Australia ............................. PD6483

[51] Int. Cl.³ ............................................ B24D 17/00
[52] U.S. Cl. ........................................ 51/293; 264/56
[58] Field of Search ............................. 51/293; 264/56

[56] References Cited

U.S. PATENT DOCUMENTS 3,960,518  6/1976  Hall ................................. 51/293
4,203,732  5/1980  Phaal ................................ 51/293

*Primary Examiner*—John A. Parrish
*Attorney, Agent, or Firm*—Depaoli & O'Brien

[57] ABSTRACT

A press for cold-forming granular tungsten carbide cutting tool edge blanks for sintering, it has helical edges on jaws which open and close around a center pin and are of a depth which allows for shrinkage during sintering, top, bottom and side members seal the forming cavity; a graphite sinter fixture has similarly-shaped forming and sealing components to the press but relies only on gravitational surface reaction to close components against a pressed blank to prevent shrinkage distortion during sintering.

16 Claims, 4 Drawing Figures

U.S. Patent    Dec. 1, 1981    4,303,416
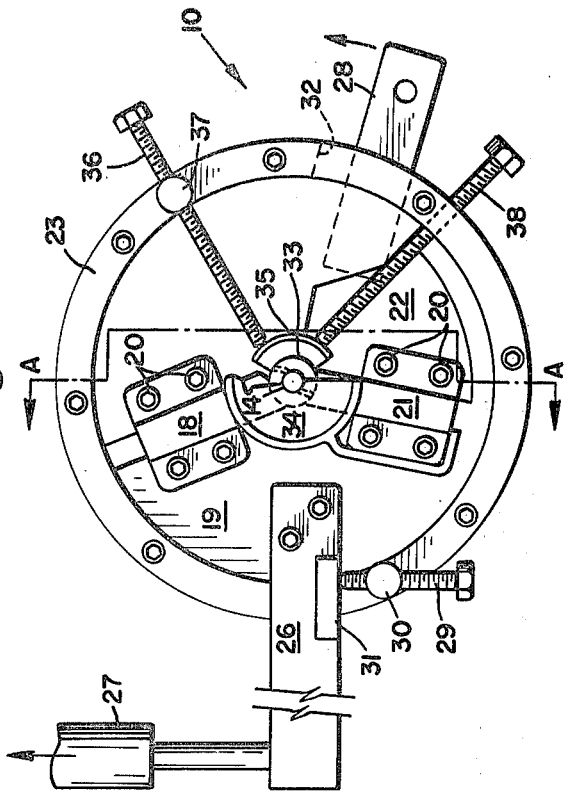
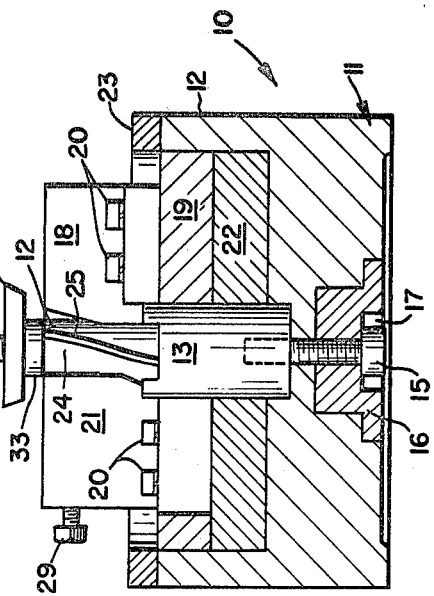
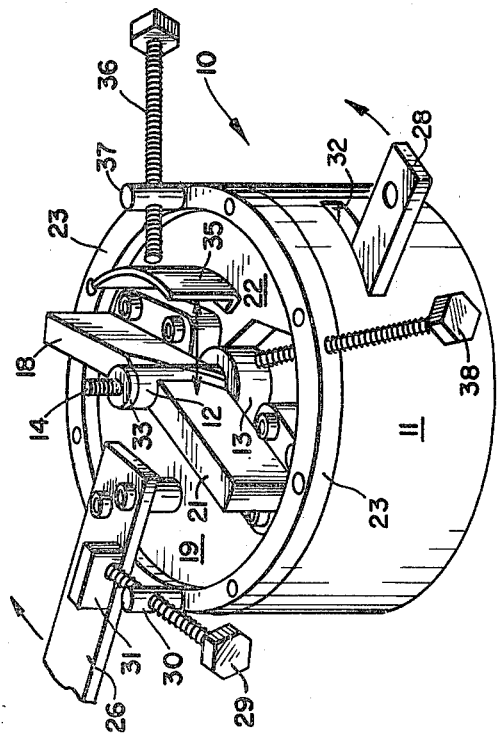
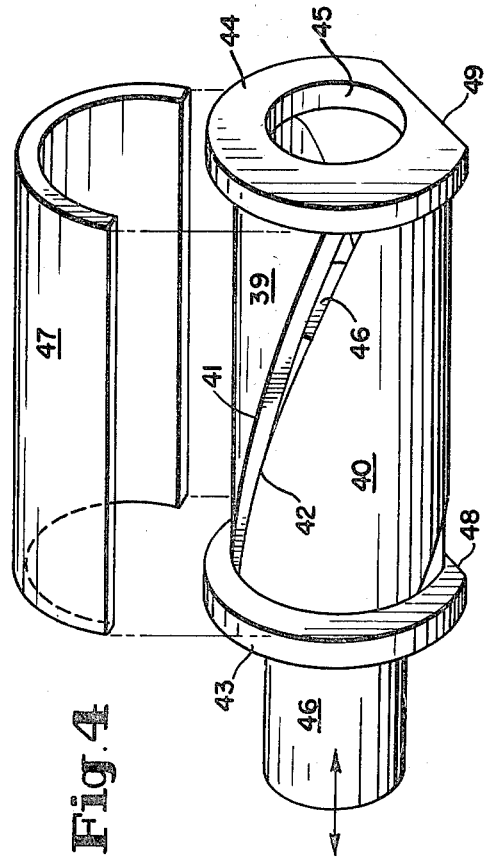

PROCESS AND APPARATUS FOR THE MANUFACTURE OF SINTERED TUNGSTEN CARBIDE TOOL TIPS

This invention concerns methods and apparatus for pressing, forming and sintering of tungsten carbide blanks for cutting tool bit inserts and is particularly concerned with a method and device for sintering pressed, helical or spiral cutting tool bit insert blanks while compensating for shrinkage distortion of the blank during sintering.

Sintered tungsten carbide cutting tool bit insert blanks used as cutting edges on high speed cutting tools such as augers or in milling machines are made by pressing powdered tungsten carbide, sometimes mixed with cobalt, under pressure into slabs or ingots from which special shapes are then cut or pressed directly into blanks of desired shape or size. Blanks are then semi-sintered in a non-oxidizing atmosphere at temperatures below 1472° F. and are further shaped by machining. Final sintering is then carried out but the sintered carbide so obtained is so hard that the shape can only be changed by diamond cutter grinding. It would be desirable to obtain a sintered shape as near to the finally desired shape as possible however in sintering techniques uncontrolled shrinkage of the tungsten carbide occurs in known art. An attempt to overcome shrinkage distortion by brushing carbide powder onto a spiral or helical cutting tool edge, partially sintering the carbide onto the tool has been made but requires reheating and bending of the tool. Another industrial technique involves placing a strip of pre-sintered or partially sintered carbide alongside the spiral cutting contour of a cutting tool and then fusing the tungsten carbide onto the tool by sintering at a higher temperature than the first-stage temperature. Uncontrolled shrinkage and distortion of the shape of the pressed carbide cutting tool insert blank occurs during sintering in the prior art processes.

One object of this invention is to provide a method for cold press forming of tungsten carbide blanks for sintering and subsequent fitment to cutting tool edges as inserts.

Another object is to provide apparatus for cold press-forming of tungsten carbide blanks for sintering and then fitment to cutting tool edges as inserts.

A further object is to provide a method for controlling the edges and surfaces of a pressed tungsten carbide blank susceptible to shrinkage shape distortion while sintering the blank for fitment to a cutting tool edge as an insert.

A still further object is to provide a device for sintering pressed, helically or spirally shaped cutting tool edge insert blanks of tungsten carbide wherein means are provided for controlling the edges and surfaces of the blank which are susceptible to shrinkage shape distortion during sintering.

The invention, according to one general aspect, resides in a method for the manufacture of pressed, shaped blanks from particulate tungsten carbide material for sintering and then fitment to cutting tool edges as inserts which comprises, charging the particulate carbide into a split die former press in a cavity formed about a centre pin by contra-reciprocating jaw members and top, bottom and side members, confining the charge between the members, closing the members and applying pressure in at least an angular direction to shape the blank and opening the members to eject the blank.

Preferably, the blank is of spiral or helical configuration and is formed from tungsten carbide granules of 80 mesh.

The invention according to another general aspect, resides in apparatus for the manufacture of pressed blanks from particulate tungsten carbide for sintering and then fitment to cutting tool edges as inserts which comprises, a press assembly having a body portion housing a central vertical forming pin, a compression jaw and an ejection jaw forming a split die adapted for horizontal, angular reciprocation about the pin in sequential jaw opening, carbide charging, closing, pressing and blank ejection movements, vertical and horizontal forming members for defining and sealing the blank charge and forming cavity also being adapted to apply pressure to the charge to form the blank.

Preferably, the split die comprises two sleeve segments divided by helical or spiral separation cuts, the thickness of the edges or surfaces defined by the cuts being substantially equal to the whole diameter or radial height of the blank insert when it is installed along a cutting edge profile of a cutting tool bit. Preferably also the die edge thickness includes an additional shrinkage height allowance of approximately 20%.

The invention according to a further general aspect, resides in a sinter fixture for sintering cutting tool insert blanks from particulate tungsten carbide made by the above-described press and which is constructed as a generally reelshaped shell split into two segments along separation cuts which are of the same configuration as the blank, each segment having a flanged end and a central bore adapted to receive a removeable pin which is adapted to hold the segments together, the flanged ends having flattened rims angularly off-set with respect to each other about the longitudinal axis of the fixture so that when the fixture is placed upon a flat surface in a sinter furnace, the helically cut or other shaped cut edges of the shells are constrained to move towards each other and to bear against the side walls of a pressed blank, the centre pin also bearing against the bottom surfaces of the blank and a curved cover member being adapted to bear against the top surface of the blank when the fixture is assembled and in use during sintering to compensate against angular and radial shrinkage of the blank during sintering.

A sintering fixture according to the invention has all the components preferably constructed of graphite and the separation cuts of the shell segments are helical or spiral.

Some practical arrangements of preferred forms of the invention will now be described with reference to the accompanying drawings in which:

FIG. 1 is a perspective view of a forming press in accordance with one form of the invention with top pressure application member removed and side cavity-sealing plate loosened.

FIG. 2 is a plan view of the press with side cavitysealing plate closed up.

FIG. 3 is a vertical section taken along line A—A of FIG. 2.

FIG. 4 is a partially exploded view of the shrinkage compensating, sintering piece for pressed and formed cutter bit insert blanks for high-speed cutting tools.

Referring to the drawings, FIGS. 1 to 3 show a cold-forming press for making pre-sinter blanks of tungsten carbide for high speed tool cutter bit inserts or tips and for similar tools which comprises a bowl-shaped body 10 with a recessed base 11, a side wall 12 and a central column 13 mounted within the body with a centre pin 14 the width of which is equal to the root diameter of a cutting tool bit and which projects above the body. The column 13 is bolted to the body by socket screw 15, the head of which clamps a securing collar 16 into the recess in the base of the body. There is mounted about the centre pin and above the column a compression jaw 18 the base of which is fixed on a compression plate 19 by socket screws 20. An ejection jaw 21 is similarly fixed to the ejection plate 22 which lies under and against the compression plate, both plates being designed for limited, angular reciprocating movement about the column and centre pin. The plates are retained within the body by the plate retaining collar 23. The jaws are formed as matching cylindrically curved sleeves split into two segments along a separation cut depending on the shape of the blank which in this particular example is helical forming a helically shaped cavity on one side of the centre pin and an ejection jaw separation (or closure) slot on the other side of the centre pin. The complementary, helically-shaped mating surfaces 24 and 25 of the split shell segments close against or towards each other and compress a particulate charge of tungsten carbide in an angular movement about the centre pin and move away from the pressed blank and each other when the ejection jaw is actuated. The two helical surfaces opposite the pin from the surfaces 24 and 25 close up about the pin when the surfaces 24 and 25 open up and vice versa. The opening and closing movements of the compression jaw 18 and the compression plate 19 are actuated by the reciprocating angular movement of the compression lever 26 which is powered by suitable means such as a pneumatic ram 27 to compress a carbide charge by application of sufficient pressure for example 100 lb. The movement of the ejection jaws 21 and ejection plate 22 is effected by the ejection lever 28 actuated by means such as a pneumatic ram. The extent of angular travel of the compression lever, plate and jaw is limited by the limit stop screw or bolt 29 mounted on the threaded post 30 and the screw is adapted to bear against the stop block 31. The extent of angular travel of the ejection lever, plate and jaw is limited by the confining edges of the angular slot 32. The forming cavity is sealed against loss of particulate carbide charge by means of the separate cavity top sealing collar 33 sealed under pressure by vertically reciprocating means 34, the separate cavity side sealing plate 35 clamped in position by the upper threaded press bolt 36 mounted on the post 37 and lower threaded press bolt 38 mounted through the plate retaining ring 23.

Referring to FIG. 4, there is shown a sintering fixture for sintering press-formed helically shaped, tungsten carbide cutting tool bit inserts which, although a separate component assembly from the press nevertheless comprises members of similar shape and function and which comprises four components constructed of graphite and in the form of a spool-shaped body on a centre pin and split into two sleeve-like segments along helical separation cuts. The segments 39 and 40 have separation cuts 41 and 42 with flanged partially circular ends 43 and 44 and longitudinal or axial bore 45 adapted to receive a removable, cylindrically shaped pin 46. The pair of opposed helical edges or surfaces of the split segment sleeves are of the same configuration as the pressed and sintered blank and when the pin is inserted into the bore, the surface of the pin is adapted to contact the lower surface of the blank which, in conjunction with the edges forms a forming and blank-retaining cavity. The cavity is also sealed by a top cover plate 47 which contacts the top of the blank. The partially cylindrical ends of each shell are each provided with flattened rims which are designed to be placed upon a flat surface in a sinter furnace and which are each off-set with respect to each other in an angular direction about the longitudinal axis of the sinter fixture so as to produce a torque or twisting closure action of the helical segments against the sides of a pressed tool blank to counteract angular shrinkage distortion of the blank in the direction of the pitch circle of an insert on a cutting tool bit edge when the blank is sintered at 1500° to 1600° C. in the fixture depending on the blank material or grade.

A sinter fixture, for sintering shaped cutting tool bit insert blanks pressed from particulate tungsten carbide, is described which comprises a generally spool-shaped shell split into two equal segments along separation cuts which are of the same configuration as the pressed and shaped blank, each segment having a cylindrical portion between a flanged end and a longitudinal bore adapted to receive a centre pin common to both segments, a curved cover being adapted to fit over the cylindrical portion of the segments and bear against the top of a pressed blank placed in a cavity formed between the separation cuts and the surface of the centre pin.

Each flanged end has a flattened rim on one side of a generally circular flange, each flattened rim being angularly off-set with respect to the longitudinal axis of the fixture so that, when the fixture is placed upon a flat surface in a sinter furnace, the shaped surfaces of the shell segments at the separation cuts are constrained by gravitational reaction to twist towards each other and bear against the side surfaces of the blank, the centre pin bearing against the bottom of the blank in conjunction with the cover bearing against the top of the blank to compensate against shrinkage distortion when sintering the blank.

When a pressed unsintered blank is placed in the cavity formed by the co-operating fixture components, it projects above the surface of the shell segments for a distance equivalent to the radial shrinkage height of a pressed segment prior to sintering as measured from a root diameter over the whole diameter of the cutting tool edge insert.

I claim:

1. A sinter fixture for sintering shaped cutting tool bit insert blanks pressed from particulate tungsten carbide which comprises a generally spool-shaped shell split into two equal segments along separation cuts which are of the same configuration as the pressed and shaped blanks, each said segment having a cylindrical portion attached to a flanged end and a longitudinal bore adapted to receive a center pin common to both segments, a curved cover being adapted to fit over the cylindrical portions of the segments and bear against the top of a pressed and shaped blank which is placed in a cavity formed between the separation cuts and the surface of the center pin.

2. A sinter fixture according to claim 1, wherein the separation cuts are of helical or spiral configuration and form mating edges which contact the sides of said pressed and shaped blanks.

3. A sinter fixture according to claim 1 or 2, wherein each said flanged end has a flattened rim on one side of a generally circular flange, each said flattened rim being angularly off-set with respect to the longitudinal axis of the fixture so that, when the fixture is placed upon a flat surface in a sinter furnace, the shaped surfaces of the shell segments at the separation cuts are constrained by gravitational reaction to twist towards each other and bear against the side surfaces of the blank, the center pin bearing against the bottom of the blank in conjunction with the cover bearing against the top of the blank to compensate against shrinkage distortion when sintering the blank.

4. A sinter fixture according to claim 1, wherein a pressed and shaped unsintered blank, when placed in said cavity, projects above the surface of the shell segments for a distance equivalent to the radial shrinkage height of a pressed segment prior to sintering as measured from a root diameter over the whole diameter of said shaped cutting tool edge insert blank.

5. A sinter fixture as claimed in claim 1, wherein all the components of the fixture are constructed from graphite.

6. A sinter fixture according to claim 2, wherein a pressed and shaped unsintered blank, when placed in said cavity, projects above the surface of the shell segments for a distance equivalent to the radial shrinkage height of a pressed segment prior to sintering as measured from a root diameter over the whole diameter of said shaped cutting tool edge insert blank.

7. A sinter fixture according to claim 3, wherein a pressed and shaped unsintered blank, when placed in said cavity, projects above the surface of the shell segments for a distance equivalent to the radial shrinkage height of a pressed segment prior to sintering as measured from a root diameter over the whole diameter of said shaped cutting tool edge insert blanks.

8. A sinter fixture as claimed in claim 2, wherein all the components of the fixture are constructed from graphite.

9. A sinter fixture as claimed in claim 3, wherein all the components of the fixture are constructed from graphite.

10. A sinter fixture as claimed in claim 4, wherein all the components of the fixture are constructed from graphite.

11. A sinter fixture for sintering helical or spiral-shaped cutting tool bit, insert blanks cold pressed from particulate tungsten carbide and for compensating against shape distortion of the blank during sintering, the fixture having a generally spool-shaped shell split longitudinally into two equal segments along separation cuts which are of complementary shape with respect to the sides of the pressed blank and form mating edges which are adapted to contact the sides of the blank, when the blank is placed between the edges, each segment of the shell having an annular cylindrical portion joined to a flanged end, the inner surface of the annular cylindrical portion forming a cylindrical bore which is adapted to receive a removeable, cylindrical center pin common to both segments; a removeable cover member having a curved surface complementary to the external surface of the segments and being adapted to be placed over the cylindrical portion of the mating segments and to bear against the top of a pressed blank when the blank is placed between the separation edges of the shell and bearing against the center pin, each shell segment having means thereon for maintaining the edges of the separation cut closed against the side walls of the blank during sintering when the fixture piece is placed on a flat surface in a sinter furnace to compensate angular and radial shrinkage of the blank to counteract shape distortion.

12. A sinter fixture according to claim 11 wherein the means for maintaining the edges of the separation cut of the shell segments closed against the side walls of the blank during sintering when the fixture piece is placed on a flat surface in a sinter furnace comprises a flattened rim portion on one side of a generally circular flange of each flanged end, each flattened rim being angularly off-set with respect to the longitudinal axis of the fixture so that, when the sinter fixture is placed upon a flat surface in a sinter furnace, with the flattened rim of the flanged end of each segment in contact with the surface, the mating edges of the split shell segments at the separation cuts are constrained by gravitational reaction to twist towards each other and bear against the side surfaces of the blank, the center pin bearing against the bottom of the blank in conjunction with the weight of the cover bearing against the top of the blank to compensate against shrinkage shape distortion when sintering the blank.

13. A sinter fixture for counteracting shape distortion during sintering of a cutting tool bit insert blank that has been cold pressed from particulate tungsten carbide, said blank being elongated and having cylindrical inner and outer surfaces and opposed side walls, said fixture comprising:

A. two equal segments of a generally spool-shaped and hollow shell having flanged ends, said segments being formed by cutting longitudinally along separation cuts which form mating edges and by partially cutting transversely adjacent each said flanged end, each said segment comprising:
  (1) a semi-cylindrical portion, having an internal cylindrical surface, which cooperatively forms a cylindrical bore when said segments are placed in mating relationship, and an external cylindrical surface,
  (2) a flange which is rigidly attached to one end of said semi-cylindrical portion,
  (3) a pair of said mating edges which have a complementary shape with respect to said side walls of said pressed blanks when one said blank is placed between said segments,
  (4) counteracting means on said flanges for maintaining a pair of said mating edges closed against said side walls during said sintering when said fixture is placed on a flat surface in a sinter furnace in order to compensate for angular and radial shrinkage of said blank and to counteract said shape distortion thereof;

B. a removable, cylindrical center pin which fits within said cylindrical bore and bears against said inner cylindrical surface when said blank is placed between said segments; and C. a removable cover member having a curved inner surface which is complementary to said external cylindrical surfaces of said segments and is adapted to be placed over said semi-cylindrical portions in order to bear against said cylindrical outer surface of said blank when said blank is placed between one of said opposed pairs of said mating edges and in axial alignment with and bearing against said center pin.

14. The sinter fixture of claim 13, wherein said counteracting means comprises a gravitationally acting means for rotating said segments in opposite directions around said center pin.

15. The sinter fixture of claim 14, wherein said gravitationally acting means comprises flattened rims on said flanges, said flattened rims being offset with respect to each other in an angular direction about the longitudinal axis of said sinter fixture so as to produce a twisting closure action of said segments against said side walls of said blank.

16. The sinter fixture of claim 15, wherein said semi-cylindrical portions have a thickness, measured radially between said internal and external cylindrical surfaces, that is less than the thickness of said blank, measured radially between said inner and outer surfaces, whereby said blank projects above said external cylindrical surfaces for a distance equivalent to the radial shrinkage height of said blank prior to sintering as measured from a root diameter over the whole diameter of said cutting tool bit insert blank.

* * * * *